Dec. 19, 1939.  J. H. RAMAGE  2,183,972
LAMP MANUFACTURE
Filed Jan. 9, 1937  2 Sheets-Sheet 1
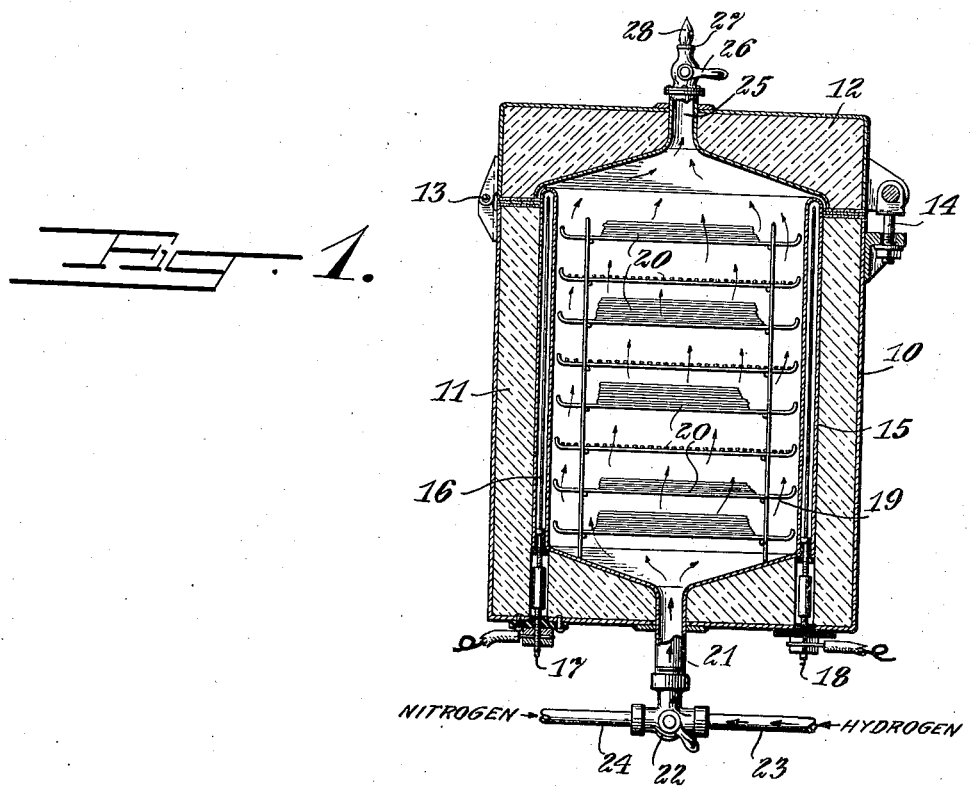
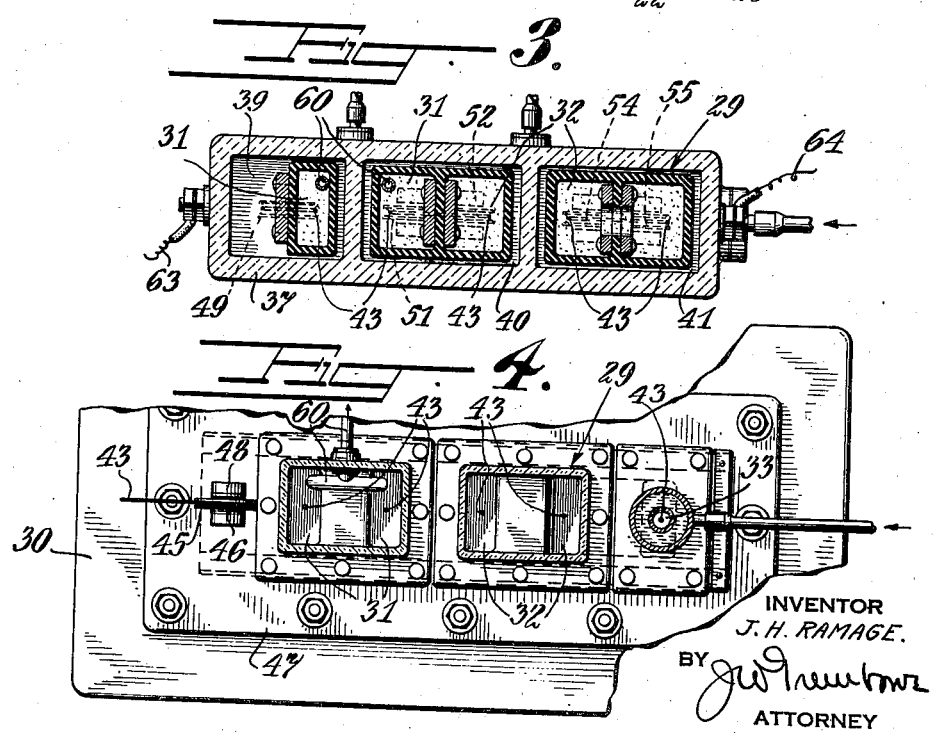
INVENTOR
J. H. RAMAGE.
BY
ATTORNEY Dec. 19, 1939.　　　J. H. RAMAGE　　　2,183,972
LAMP MANUFACTURE
Filed Jan. 9, 1937　　　2 Sheets-Sheet 2
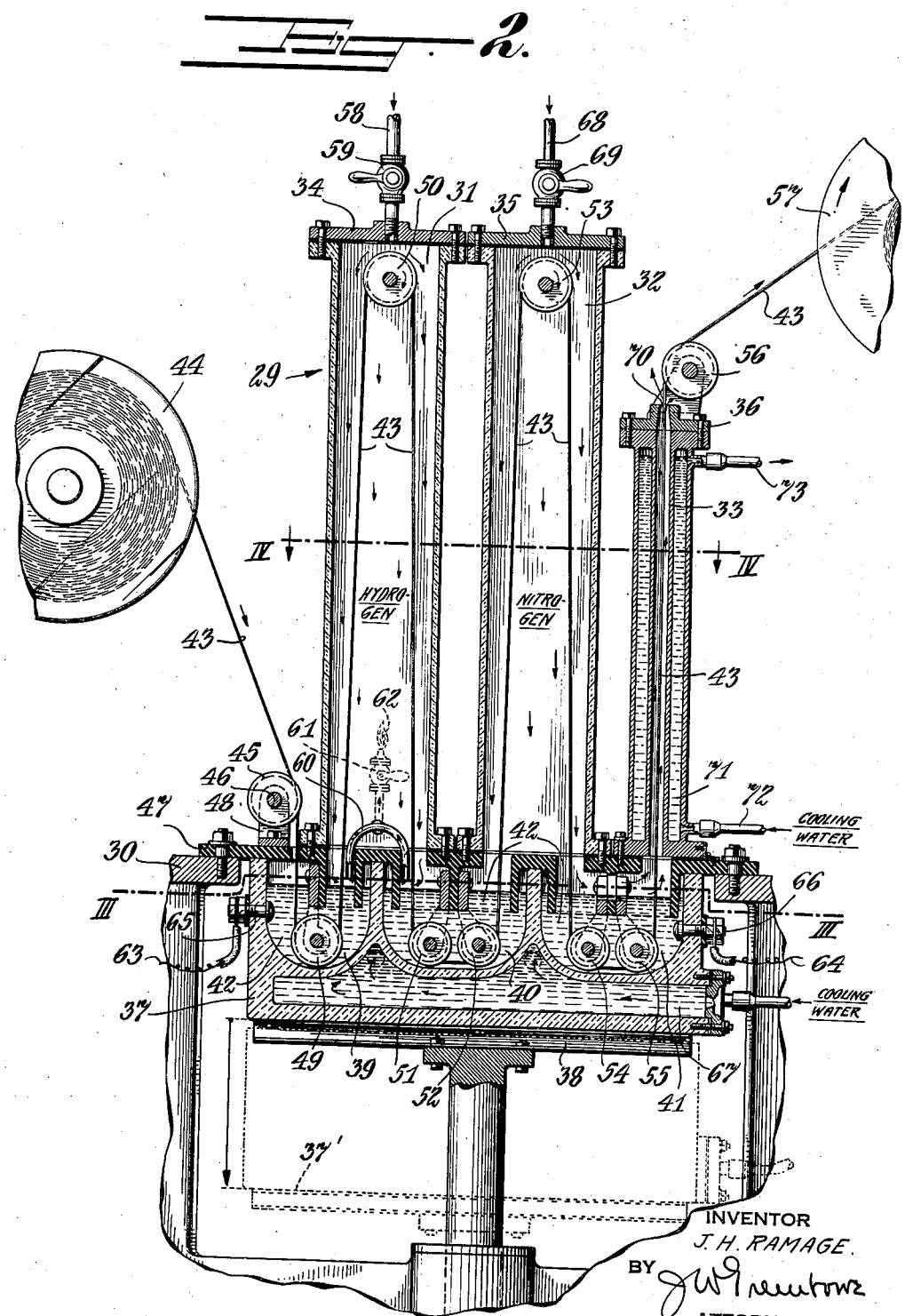
INVENTOR
J. H. RAMAGE.
BY
ATTORNEY Patented Dec. 19, 1939

2,183,972

UNITED STATES PATENT OFFICE 2,183,972

LAMP MANUFACTURE

John H. Ramage, Bloomfield, N. J., assignor to Westinghouse Electric & Manufacturing Company, East Pittsburgh, Pa., a corporation of Pennsylvania Application January 9, 1937, Serial No. 119,763

3 Claims. (Cl. 176—7)

This invention relates to lamp manufacture and more particularly to a method and apparatus for treating metal parts for use in a lamp in order to prevent early blackening of the bulb.

Ordinarily, both the metallic lead wires and the filament inside an incandescent electric lamp contain hydrogen gas which is given off when the temperature is raised above a red heat. If any of the metallic parts within the lamp bulb are oxidized, and such oxides are reducible at low temperatures in hydrogen, as is the case with regard to all of the metals now in use in lamp manufacture, this hydrogen when released in the bulb reduces such oxides to form water vapor, and early blackening results as in the case of a poor exhaust.

When the metallic parts within the lamp are saturated with either an inert gas, or one which represses the formation of water, none is formed and blackening does not result. It is possible to prevent such blackening by using parts which give off carbon monoxide, for example, in which case even in the presence of hydrogen no water vapor blackening results. However, with carbon-containing gases like carbon monoxide, detrimental results occur later in the life of the lamp due to carbonization. When, however, an inert gas such as nitrogen for example, is used, water is not formed and no carbonaceous gases are introduced.

It is therefore an object of my invention to prevent early blackening in lamps by employing hydrogen-free metal parts in the lamp bulbs.

Another object of my invention is the treatment of metal parts in the bulb so that water vapor will not be formed, even though certain of said parts are oxidized.

A further object of my invention is the replacement of hydrogen, formerly contained in metal lamp parts such as leads and filaments, by an inert gas such as nitrogen, to avoid detrimental effects such as the formation of water vapor in the lamp by the combination of such contained hydrogen with oxides of metal such as nickel, copper, iron, molybdenum, and tungsten, commonly found in lamps and other vacuum devices.

A still further object of my invention is to obtain metal, for example, nickel free of carbon-containing gas as well as hydrogen, and containing only inert gas, for example, nitrogen.

Other objects and advantages of the invention relating to the particular arrangement and construction of various parts will become apparent as the description proceeds.

Referring to the drawings illustrating my invention:

Figure 1 is a vertical sectional view of a furnace for treating metal lamp parts.

Fig. 2 is a vertical sectional view of another form of apparatus embodying my invention.

Fig. 3 is a fragmentary horizontal sectional view on the line III—III of Fig. 2.

Fig. 4 is a fragmentary horizontal sectional view on the line IV—IV of Fig. 2, looking in the direction of the arrows.

Referring to the drawings in detail, and first considering the embodiment of my invention illustrated in Fig. 1, there is shown an electric furnace 10 comprising a heat insulated chamber 11 with a cover 12 hinged, as indicated at 13, and clamped or latched in position by securing means 14. The chamber 11 has a refractory metal lining 15, housing electrical resistance wires 16 adapted to be energized from any suitable source of electric current, through leading-in conductors 17 and 18.

Contained in the furnace is a rack 19 serving to support the metal, such as tungsten wire for lamp filaments, and nickel leads for electric lamps, indicated by the reference character 20. The furnace has an inlet pipe 21 which connects, through a three-way valve 22, with supply pipes 23 and 24 and an outlet pipe 25 controlled by valve 26.

In practicing my invention the filamentary material or nickel wire 20, which may be in the form of loosely wound coils, is introduced into the furnace 10, the cover 12 closed and secured. The valve 26 is opened and the valve 22 operated to admit hydrogen through the supply pipe 23 and inlet pipe 21 to the chamber 11. After flushing hydrogen through the outfit for a period of about fifteen minutes to remove all traces of oxygen, due to the air left in it, the resistance wire 16 is energized until the furnace reaches the desired temperature, say about 760° C., or any higher temperature up to 1100° C., at which nickel wire will not stick to the furnace or itself. This treatment replaces the unknown gases by hydrogen on account of diffusion. These unknown gases, in the case of nickel, are usually a mixture in varying proportions of CO, $CO_2$, $CH_4$, $O_2$, $N_2$, and $H_2$, the carbon containing gases predominating. The process is continued for a sufficient length of time, such as ten minutes, while the material in the furnace is heated, so that all the gas previously contained in the wire 20 is flushed out and replaced by hydrogen. The valve 26 may terminate in a tip 27 to allow for burning the hydrogen as it emerges from the furnace, as indicated at 28.

The next step in the process is the introduction of some gas, such as nitrogen, which is inert to hydrogen and will not reduce oxides with the formation of water vapor. For this purpose the valve 22 is turned so as to allow nitrogen to flow through the supply pipe 24 and inlet pipe 21 into the chamber 11, where it flushes out the hydrogen remaining in said furnace, and the wire 20 is treated therein, for say about ten minutes, until all the hydrogen absorbed during the previous treatment has been replaced by the inert gas used. As in the previous treatment, the temperature is maintained at say about 760° C., or any higher temperature up to 1100° C., which allows for fairly rapid diffusion of the hydrogen from the wire and replacement by the nitrogen which is absorbed.

In order to entrap the nitrogen in the metal wire 20, the current to the furnace is turned off and the whole allowed to cool to approximately room temperature, the atmosphere of nitrogen being still maintained before removing the wire. In this way a wire is produced which has nitrogen absorbed therein, which gas will stay in place until heated. When such wire is subsequently used in a lamp or other vacuum device, the generation of the absorbed gas upon heating does not have any material deleterious effect, as nitrogen is inert to oxides and the incandescent filament. It has also been found that this nitrogen-containing nickel burns or oxidizes less at the heating operations, such as stem making, than do either carbon-gas nickel, hydrogen nickel, or vacuum treated nickel.

Referring now to the modified form of apparatus illustrated in Figs. 2, 3, and 4, there is shown a gas treating device 29 supported on a base 30, and comprising an insulative hydrogen chamber or compartment 31, an insulative nitrogen compartment 32, and a cooling compartment 33, closed at the top by covers 34, 35, and 36, and at the bottom by the common closure device 37.

The closure device 37 is, in the present embodiment, shown mounted on a ram-supported platform 38 which serves to lift it to the closed position illustrated in full lines in Fig. 2, or lower it to the open or loading position 37', illustrated in dot-dash lines. The bottom closure element 37 contains receptacles 39, 40, and 41 for gastight sealing liquid, such as mercury 42, so that when the bottom closure member 37 is in position, represented in full lines, the compartments 31 and 32 are separated from one another, while the compartments 32 and 33 are joined above the level of the contained mercury 42.

The apparatus is to provide for treating filamentary material, such as tungsten or nickel wire, for use in incandescent electric lamps by a continuous process. In carrying out such a process, the wire 43 is drawn from a revolvably mounted reel 44 over a pulley 45, rotatably mounted on a shaft 46 supported from the insulative mount 47 by means of bracket 48. After passing over the pulley 45, the wire then goes into the mercury 42 contained in receptacle 39, over a submerged pulley 49, up through receptacle 31, over pulley 50, down through receptacle 31, over submerged pulley 51, submerged pulley 52, up through receptacle 32, over pulley 53, down through said receptacle, over submerged pulleys 54 and 55, up through cooling chamber 33, and over pulley 56, from whence it goes to be wound on reel 57.

Although the foregoing description has been applied to only one wire, 43, passing over one set of pulleys, it is obviously desirable that the wire pass through the apparatus in multiple, over pulleys arranged side by side, in order to provide the desired capacity. It will therefore be understood that the foregoing description is applicable to the treating of a series of parallel wires passing through such a machine, over pulleys arranged side by side.

During movement of the wire 43 through the apparatus, the receptacle 31 is kept filled with hydrogen which is fed thereto through inlet pipe 58 and valve 59, desirably positioned at the top because of the lightness of hydrogen, and exhausted through outlet pipes 60 and valve 61, to be burnt in a jet, as indicated at 62. In order to effectively flush out the gases contained in the wire, a highly diffusive gas such as hydrogen is used to initially replace them. The wire, during the passage through the receptacles 31 and 32, is kept heated to a temperature approximating 760° C., up to 1100° C., by the passage of electric current therethrough, the heating not being started until the air in the chamber 31 has been completely replaced by hydrogen. This flow of current is desirably maintained between the leading-in conductors 63 and 64, between which it traverses the binding post 65 in the insulative wall of cover member 37, mercury 42 in receptacle 39, wire or wires 43 between pulleys 49 and 50, wire or wires 43 between pulleys 50 and 51, mercury 42 in receptacle 40, wire or wires between pulleys 52 and 53, wire or wires between pulleys 53 and 54, mercury 42 in receptacle 41, binding post 66, to leading-in conductor 64.

In this way the filament is maintained at the desired temperature without the necessity for heating the enclosing apparatus to any great extent. However, in order to prevent any undue evaporization of the mercury 42, on account of overheating, provision is made for the circulation of cooling water 67 beneath the mercury receptacles 39, 40, and 41.

After receiving the hydrogen treatment, the wire passes through the compartment 32, where it is desirably heated to approximately the same temperature in nitrogen which flows from the inlet pipe 68, through valve 69, down along the length of wire 43 in compartment 32, up through the cooling compartment 33, and out from the exhaust outlet 70. The nitrogen in the compartment 33 may be cooled naturally or by circulation of water through a jacket 71, from inlet pipe 72 to outlet pipe 73, whereby the wire is allowed to cool to room temperature in the atmosphere of nitrogen or other inert gas which may be used, thereby efficiently entrapping such gas in the metal, and preventing subsequent contamination of said metal by undesirable gas prior to its introduction into an electric lamp or other vacuum device.

From the foregoing it will be seen that I have devised a method of preventing early blackening and apparatus for practicing this method, both intermittently and continuously, by flushing the unknown gas content from metal lamp parts, particularly nickel, although the method may be used on tungsten, molybdenum and other metals, replacing it by hydrogen, or other highly diffusive gas, and subsequently flushing said hydrogen out of said metal parts by an atmosphere of nitrogen or other gas inert with respect to an incandescent filament and also inert with respect to the hydrogen, in order to saturate the metal with the inert gas.

Although hydrogen is preferred as a highly diffusive gas, it is clear that some other active gas of similar characteristics could be substituted. It will also be clear that although nitrogen is preferred and specified as the gas that is eventually substituted for hydrogen in the metal, yet other inert gases, as for instance helium, argon, neon, etc., could be substituted for nitrogen. The method therefore essentially consists in removing existing gases by heating and flushing with the highly diffusive gas, such as hydrogen, and then substituting the desired inert gas by switching the gas flow from hydrogen to the desired inert gas, while the wire is maintained at the desired elevated temperature, holding the temperature of said wire in the desired inert gas a sufficient time to allow, by flushing and diffusion, the removal of all or most of the hydrogen gas from the metal, and then cooling to room temperature in the nitrogen or other inert gas, thus entrapping said gas in the metal.

Besides the aforementioned novel process, it will also be apparent that I have devised a method of successfully using oxidized metal parts in a lamp without danger of forming water vapor resulting in early blackening of the bulb.

Although preferred embodiments of my invention have been disclosed, it will be understood that modifications may be made within the spirit and scope of the appended claims.

I claim:

1. The method of treating metal parts for vacuum devices comprising flushing with hydrogen at an elevated temperature, flushing with nitrogen at an elevated temperature, and finally cooling in said nitrogen.

2. The method of treating metal parts for vacuum devices comprising flushing with hydrogen at an elevated temperature, flushing with nitrogen at an elevated temperature, holding said parts at said temperature in nitrogen a sufficient length of time to allow the nitrogen to replace the hydrogen in the metal, and finally cooling in nitrogen to entrap said gas in said metal.

3. The method of treating metal wire comprising heating to elevated temperature in flowing hydrogen and, while still heated, subjecting it to flowing nitrogen in order to replace the hydrogen absorbed therein by nitrogen, and subsequently cooling said wire in nitrogen.

JOHN H. RAMAGE.